United States Patent [19]
Köhler et al.

[11] Patent Number: 5,639,569
[45] Date of Patent: Jun. 17, 1997

[54] GASTIGHT, SEALED METAL OXIDE/METAL HYDRIDE STORAGE BATTERY

[75] Inventors: Uwe Köhler, Kelkheim, Germany; Guangsen Chen; Jürgen Lindner, both of Singapore, Singapore

[73] Assignee: Varta Batterie Aktiengesellschaft, Hanover, Germany

[21] Appl. No.: 506,836

[22] Filed: Jul. 25, 1995

[30] Foreign Application Priority Data

Jul. 29, 1994 [DE] Germany ............... 44 26 958.7

[51] Int. Cl.$^6$ ............... H01M 10/34
[52] U.S. Cl. ............... 429/59
[58] Field of Search ............... 429/57, 59, 60

[56] References Cited

U.S. PATENT DOCUMENTS

| | | | |
|---|---|---|---|
| 4,246,326 | 1/1981 | Sprengel et al. | 429/59 |
| 5,354,576 | 10/1994 | Zhang et al. | 429/59 |
| 5,376,474 | 12/1994 | Tadokoro et al. | 429/59 |
| 5,447,806 | 9/1995 | Hoge et al. | 429/59 |

FOREIGN PATENT DOCUMENTS

| | | |
|---|---|---|
| 3929306 | 9/1989 | Germany . |
| 4039503 | 9/1990 | Germany . |

*Primary Examiner*—Stephen Kalafut
*Assistant Examiner*—Jonathan S. Krueger
*Attorney, Agent, or Firm*—Weiser & Associates, P.C.

[57] ABSTRACT

A gastight, sealed metal oxide/metal hydride storage battery, in particular, a nickel/metal hydride button cell, includes an auxiliary electrode with an active material composed of the same hydrogen storage alloy as that of the negative electrode with which the auxiliary electrode is electrically associated. As a result, the auxiliary electrode can maintain both oxygen consumption as well as hydrogen consumption (in the event of overcharging or polarity reversal of the cell). High gas consumption rates in the event of overcharging and polarity reversal are achieved with a strongly hydrophobic adjustment of the auxiliary electrode and a relatively weakly hydrophobic or hydrophilic adjustment of the negative electrode (by means of hydrophobic or hydrophilic binder additions, respectively), and by adding a highly conductive metal powder (Cu or Ni) to the mass of the negative electrode. Also achieved is a good discharge capacity, even at high currents of up to 2 CA.

11 Claims, 2 Drawing Sheets

GASTIGHT, SEALED METAL OXIDE/METAL HYDRIDE STORAGE BATTERY

BACKGROUND OF THE INVENTION

The present invention relates to a gastight, sealed metal oxide/metal hydride storage battery having a cell casing for containing a positive electrode comprised of a metal oxide, a negative electrode comprised of a hydrogen storage alloy, a separator disposed between the positive and negative electrodes which contains an alkaline electrolyte, and an auxiliary electrode for maintaining oxygen consumption which is in electrically conducting contact with the negative electrode.

A preferred field of application of the present invention is in button cells of the Ni/metal hydride type. This is because of their efficiency and their established use in mains-independent devices. However, the load-carrying capacity of such cells for high currents generally does not reach that of cylindrical cells. This is believed to be due to the conductivity of the negative electrode of a button cell, which is relatively low. This lower conductivity is due to the proportion of the plastic binder in the mass mixture, which is preferably composed of PTFE and which can amount to 10% of the mass. However, the addition of this binder is necessary for reasons of mechanical strength, and to impart a hydrophobic nature to the mass to create the conditions needed for adequate gas consumption in the event of overcharging and polarity reversal.

Rechargeable, gastight metal oxide/metal hydride button cells, as a generic class, must be both capable of overcharging and protected against polarity reversal. During overcharging, oxygen is generated at the positive electrode and has to be consumed to avoid an unacceptably high internal pressure. A means suitable for this purpose is the auxiliary electrode, which is usually composed of a mixture of carbon black, graphite and PTFE. The auxiliary electrode is generally situated to the rear of, and is electrically short-circuited to the negative (main) electrode. The mechanism by which oxygen consumption occurs can be described by the equation: $O_2 + 4e^- + 4H_2O = 4\ OH^-$ (Equation 1). An example of a metal oxide/metal hydride button cell having an auxiliary electrode for such oxygen consumption is described in German Offenlegungsschrift 39 29 306 (with reference to FIG. 4).

If a metal oxide/metal hydride storage battery enters polarity reversal (after exhaustive discharge of the positive electrode, which generally limits the discharge), the positive electrode will then develop hydrogen. This hydrogen can be absorbed directly by the negative electrode (with a conversion to metal hydride). However, this can take place only at a metallic surface which is in direct communication with the gas phase of the battery system. A liquid film at the metallic surface will considerably impede hydrogen absorption. The presence of a hydrophobic binder can keep the electrolyte away from the electrode surface and thus facilitate the penetration of hydrogen into the interior of the negative mass.

German Offenlegungsschrift 40 29 503 also discloses an alkaline storage battery having a negative metal hydride electrode. The active mass of the disclosed electrode further includes a special catalyst composed of Raney nickel or Raney silver, which are specifically added for the oxidation of hydrogen which is produced in the event of a polarity reversal.

Nevertheless, there remains the disadvantage of reduced electrical conductivity due to the use of a hydrophobic binder. For mass electrodes, while the binder acts to ensure the cohesion and hydrophobicity of the compacted powder mass, it also acts as an electrical insulator. As a result, good protection against polarity reversal and good current-carrying capacity tend to be mutually exclusive.

SUMMARY OF THE INVENTION

It is therefore the object of the present invention to provide a storage battery in the form of a button cell which employs an alkaline metal oxide/hydrogen system, and which can be operated without compromising its gastight function, even at high currents.

This and other objects are achieved in accordance with the present invention by providing the storage battery with an auxiliary electrode which, in addition to its normal function of providing the metal oxide/metal hydride cell with suitable oxygen consumption, also operates to take over the rapid conversion of hydrogen necessary in the case of a polarity reversal. To this end, the auxiliary electrode (like the negative main electrode) has a hydrogen storage alloy as its main component, and is connected to the negative electrode of the cell in an electrically conducting manner. Preferably, the auxiliary electrode rests directly against the rear face of the negative main electrode. The auxiliary electrode of the present invention can advantageously be used in cylindrical cells and prismatic cells, and is particularly suitable for use in button cells.

For further discussion regarding the improvements of the present invention, reference is made to the detailed description which is provided below, taken in conjunction with the following illustrations.

DETAILED DESCRIPTION OF PREFERRED EMBODIMENTS

Figure 2:
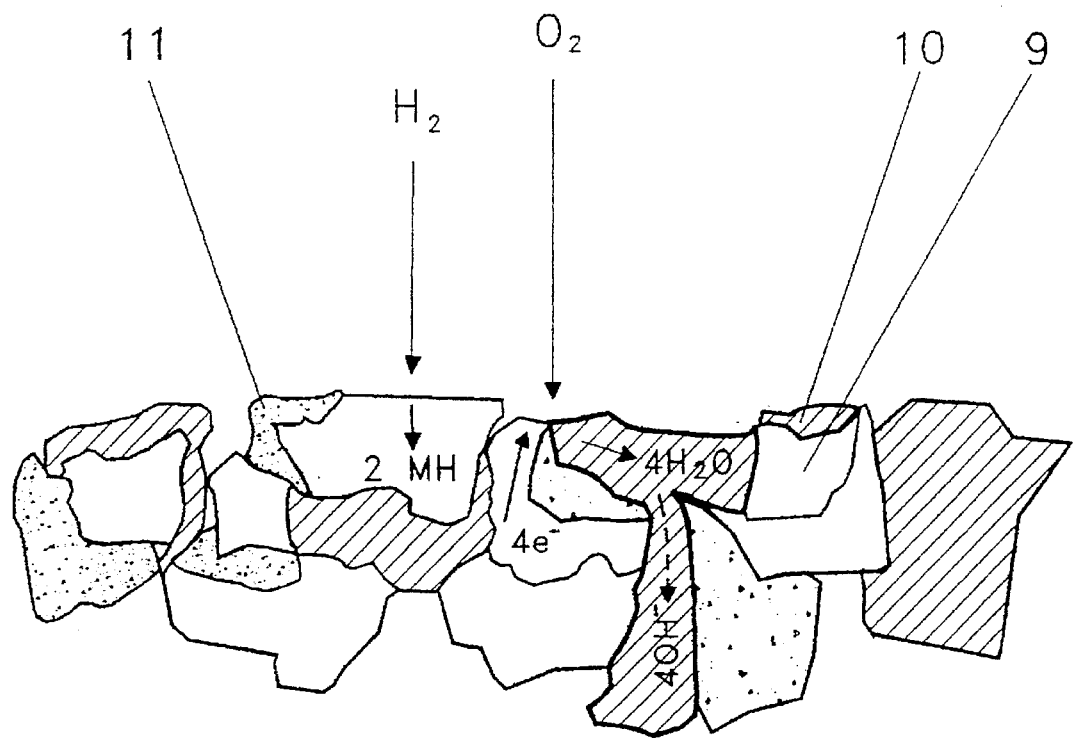
FIG. 2 schematically shows the surface structure of an auxiliary electrode produced in accordance with the present invention.

The auxiliary electrode of the present invention is produced by mixing a hydrogen storage alloy with a carbon-containing, hydrophobic material. Preferably, this includes a mixture of graphite, carbon black and PTFE (e.g., in a high-speed knife mill). The resulting mixture is extremely fine-grained and homogeneous. On the one hand, this provides a multiplicity of three-phase boundaries, which are required for oxygen consumption. On the other hand, numerous surfaces are free of electrolyte (coverage), for the presentation of hydrogen. This makes it possible for hydrogen to rapidly penetrate the alloy particles.

Further in accordance with the present invention, the negative main electrode is advantageously produced from a powder which, in addition to a hydrogen storage alloy as its main component, also contains metallic nickel or metallic copper (in powdered form) as a highly conductive component. Graphite may also be used as an alternative conducting agent.

Furthermore, to improve the structural integrity of the compacted electrode, the electrode mixture may contain a suitable binder. This binder will be hydrophilic, or at least weakly hydrophobic in nature, in contrast to the binder normally used in the auxiliary electrode. Examples include polyvinyl alcohol and polyethylene.

By joining a hydrophobic auxiliary electrode formed from a hydrogen storage alloy to a negative main electrode composed of the same hydrogen storage alloy and having a high electrical conductivity (due to the metal additives and an at least weakly hydrophobic nature), the resulting electrode combination combines two desirable capabilities; namely, load-carrying capacity for high currents and the prevention of pressure build-up following a polarity reversal.

In particular, and in contrast to the oxygen-consumption electrodes of conventional Ni/hydride and Ni/Cd cells, the novel auxiliary electrode of the present invention achieves the removal of both oxygen and hydrogen from the gas phase. A strong and permanent hydrophobic behavior is indispensable for this dual function of the auxiliary electrode to take place.

A preferred auxiliary electrode having such properties is generally based on a mass mixture composed of 0 to 20% by weight of graphite, 0 to 20% by weight of carbon black, and 0.5 to 10% by weight of PTFE, with the remainder (to 100% by weight) being a hydrogen storage alloy. A particularly advantageous mixture includes 0 to 4% by weight of graphite, 1 to 3% by weight of carbon black, and 1 to 4% by weight of PTFE, with the remainder (to 100% by weight) being the hydrogen storage alloy.

Different mass mixtures are suitable for producing the negative main electrode. As an example, the mass mixture for the negative main electrode may be composed of 10 to 50% by weight (and preferably 20 to 40% by weight) of Cu powder or Ni powder, and 0 to 10% by weight (and preferably 1 to 4% by weight) of a hydrophilic binder, with the remainder (to 100% by weight) being a hydrogen storage alloy. Alternatively, the mass mixture may be composed of 0 to 20% by weight (and preferably 10 to 15% by weight) of graphite, and 0 to 10% by weight (and preferably 0.5 to 4% by weight) of a hydrophilic binder, with the remainder (to 100% by weight) being a hydrogen storage alloy. For these two alternative mass mixtures (metal powder or graphite as the conducting agent), the content of alloy metal is approximately between 70% and 95% by weight.

Alloys which are suitable as hydrogen storage material include alloys of the $LaNi_5$ type or the $TiNi$ type. Alloys of the $LaNi_5$ type in which lanthanum and/or other rare-earth elements form the mixed metal component of the $MmNi_5$ alloys, are preferred. An exemplary alloy has the composition $MmNi_{4.3-x}Co_xMn_{0.3}Al_{0.4}$, where $0.2<x<0.7$.

Typical mass mixtures for the positive electrode contain, in addition to nickel hydroxide, metallic nickel and cobalt, graphite and cobalt oxide. These additives predominantly act as conducting material. Cobalt oxide additionally ensures an increase in the oxygen overvoltage at the positive electrode, and consequently, an increase in charging efficiency.

Figure 1:
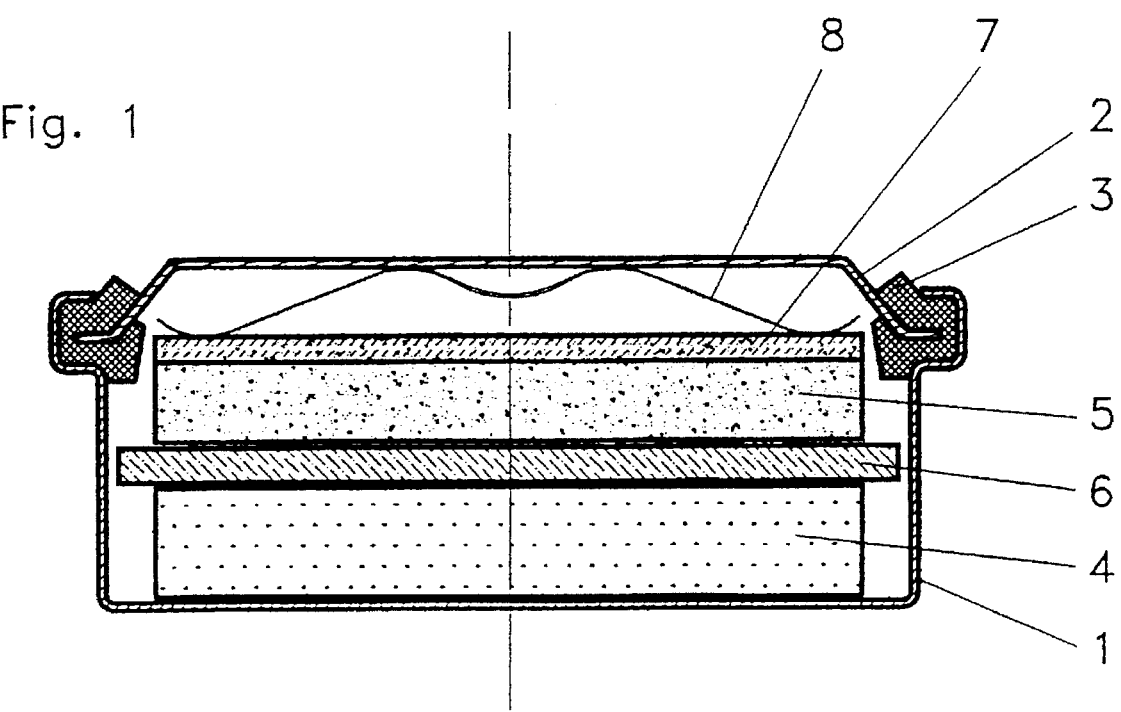
FIG. 1 is a cross-sectioned view of a Ni/hydride button cell of the present invention.

In terms of its structure, and with reference to FIG. 1, the storage battery of the present invention does not differ materially from a conventional Ni/hydride button cell. Generally speaking, the cell includes a casing (can) 1 and a lid 2, separated by a sealing ring 3. The cell contains a positive nickel hydroxide electrode 4, a negative metal hydride electrode 5, an electrolyte-impregnated separator 6, an auxiliary electrode 7 (for oxygen consumption) and a compression spring 8 for ensuring a proper (tight) assembly of these structures. However, in contrast to conventional button cells, the auxiliary electrode is in this case pressed against the back of the negative electrode, and is composed of an alloy which is strongly hydrophobic due to the additional of PTFE (while the negative electrode is itself hydrophilic).

Referring to FIG. 2, the surface of the auxiliary electrode takes the form of individual metal hydride particles 9 which are partially wetted by an electrolyte film 10, but which are partially cemented to neighboring particles by the hydrophilic binder 11 (PTFE). Large portions of the surface of the metal hydride particles are not covered by liquid electrolyte because of the water-repellent effect of the binder. At these points, hydrogen can easily penetrate into the interior of the particles. As a result, hydrogen is absorbed by the alloy metal, and removed from the gas space.

At other points, the conditions are beneficial for oxygen consumption, resulting from the simultaneous presence of electrolyte, hydrophobic binder and an exposed particle surface. Because oxygen consumption proceeds in accordance with the previously mentioned equation (Equation 1), this is made possible only with the intervention of water and in an electronic exchange with the solid alloy phase (three-phase relationship).

Figure 3:
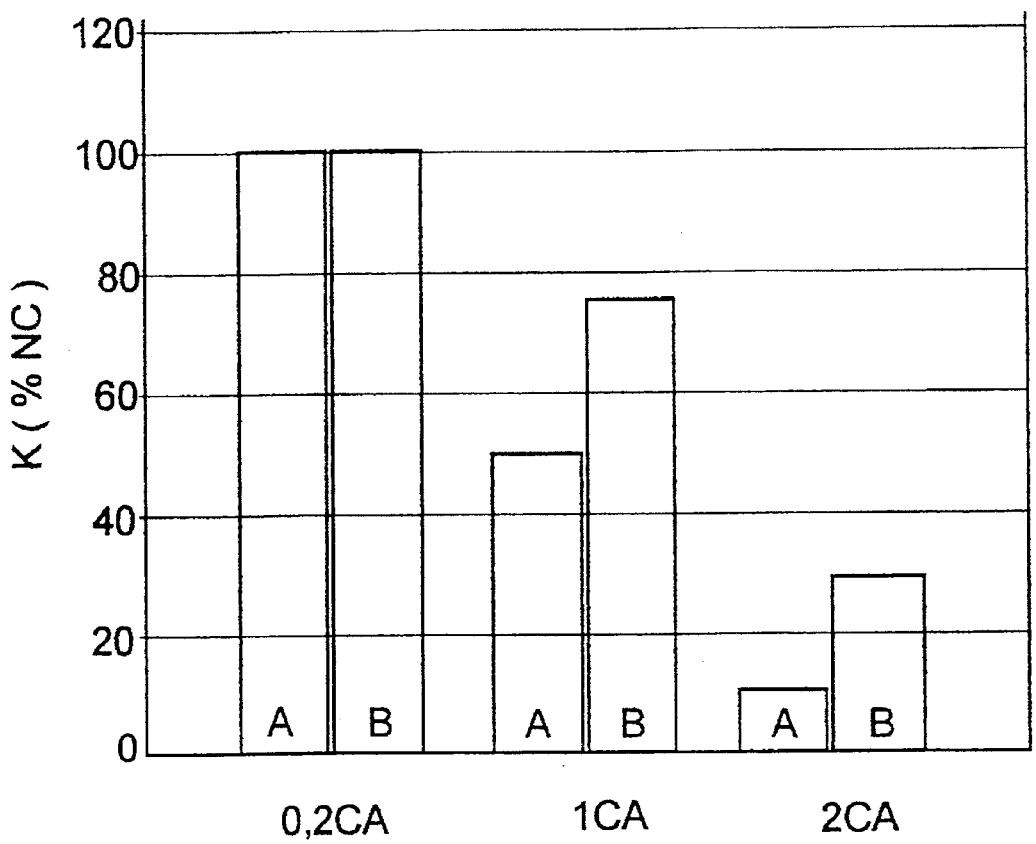
FIG. 3 is a graph showing discharge capacities for the button cells of the present invention as compared with standard cells.

FIG. 3 shows the superior, high current-carrying capacity of button cells which are provided with negative electrodes and auxiliary electrodes in accordance with the present invention, using copper as a conducting agent. The mass compositions of the test electrodes were produced in accordance with the formulations previously specified. As is evident from the illustrated bar chart representations, the discharge capacities K (in % of the nominal capacity, NC) of the button cells (B) of the present invention were appreciably above those of the standard production cells (A) at the higher loads of 1 CA and 2 CA. An important reason for the better high-current behavior of the cells of the present invention is their lack of a hydrophobic binder in the negative electrode, which is responsible for more beneficial electronic conductivity.

Figure 4:
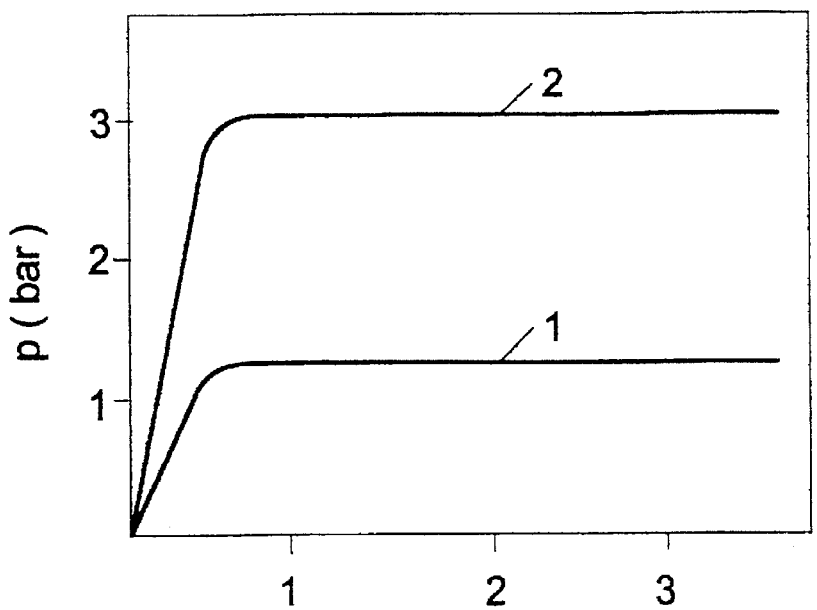
FIG. 4 is a graph showing internal gas pressures for button cells produced according to the present invention, for different operating states.

The gas-consumption performance of the auxiliary electrode of the present invention is manifested in the internal cell gas pressures exhibited both in the case of overcharging and in the case of overdischarging. Referring to FIG. 4, the internal pressure p (in bar) of a 250 mAh button cell is only approximately 1 bar (curve 1) for an overcharging with 0.2 CA. In the case of a polarity reversal, the internal pressure hardly exceeds 3 bar (curve 2) for the same current. Pressures of this magnitude are quite safe for maintaining the structural integrity of a button cell.

It will be understood that various changes in the details, materials and arrangement of parts which have been herein described and illustrated in order to explain the nature of this invention may be made by those skilled in the art within the principle and scope of the invention as expressed in the following claims.

What is claimed:

1. A gastight, sealed metal oxide/metal hydride storage battery including a cell casing housing a positive electrode comprised of a metal oxide, a negative electrode comprised of a hydrogen storage alloy and a hydrophilic binder, a separator disposed between the positive electrode and the negative electrode and containing an alkaline electrolyte, and an auxiliary electrode for maintaining oxygen consumption, wherein the auxiliary electrode contains a hydrogen storage alloy for maintaining gas consumption during overcharging and polarity reversal and a hydrophobic binder, and wherein the auxiliary electrode is electrically coupled with the negative electrode.

2. The gastight, sealed storage battery of claim 1 wherein the auxiliary electrode is positioned against a rear face of the negative electrode, opposing the positive electrode.

3. The gastight, sealed storage battery of claim 1 wherein the alloy of the negative electrode further includes a conducting agent selected from the group consisting of Cu powder, Ni powder and graphite.

4. The gastight, sealed storage battery of claim 1 wherein the alloy of the auxiliary electrode further includes graphite and carbon black.

5. The gastight, sealed storage battery of claim 4 wherein the alloy of the auxiliary electrode further includes PTFE as a binder.

6. The gastight, sealed storage battery of claim 1 wherein the auxiliary electrode has a mass mixture comprised of 0 to 20% by weight of graphite, 0 to 20% by weight of carbon black, 0.5 to 10% by weight of PTFE, and a remainder to 100% by weight of the hydrogen storage alloy.

7. The gastight, sealed storage battery of claim 6 wherein the mass mixture of the auxiliary electrode is comprised of 0 to 4% by weight of graphite, 1 to 3% by weight of carbon black, 1 to 4% by weight of PTFE, and the remainder to 100% by weight of the hydrogen storage alloy.

8. The gastight, sealed storage battery of claim 1 wherein the negative electrode has a mass mixture comprised of 10 to 50% by weight of Cu powder or Ni powder, 0 to 10% by weight of a hydrophilic binder, and a remainder to 100% by weight of the hydrogen storage alloy.

9. The gastight, sealed storage battery of claim 8 wherein the mass mixture of the negative electrode is comprised of 20 to 40% by weight of Cu powder or Ni powder, 1 to 4% by weight of the hydrophilic binder, and the remainder to 100% by weight of the hydrogen storage alloy.

10. The gastight, sealed storage battery of claim 1 wherein the negative electrode has a mass mixture comprised of 0 to 20% by weight of graphite, 0 to 10% by weight of a hydrophilic binder, and a remainder to 100% by weight of the hydrogen storage alloy.

11. The gastight, sealed storage battery of claim 10 wherein the negative electrode is comprised of 10 to 15% by weight of graphite, 0.5 to 4% by weight of the hydrophilic binder, and the remainder to 100% by weight of the hydrogen storage alloy.

* * * * *